C. W. MILES.
METHOD AND APPARATUS FOR CASTING.
APPLICATION FILED DEC. 14, 1911.
1,123,134.
Patented Dec. 29, 1914.
2 SHEETS—SHEET 1.
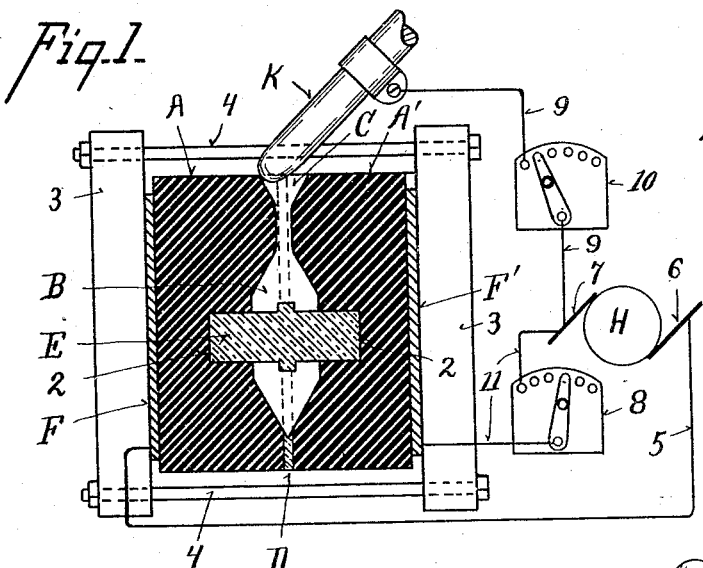
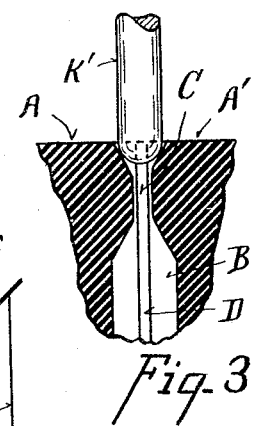
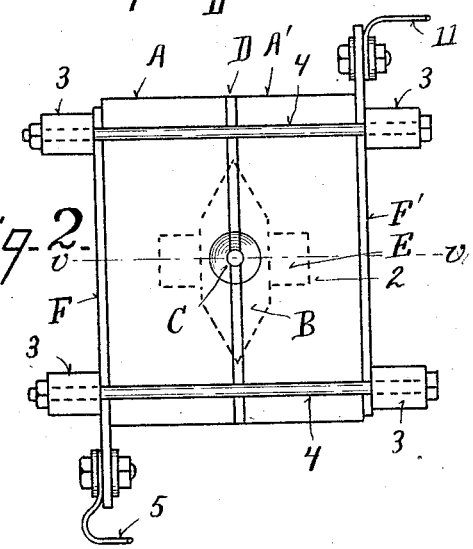
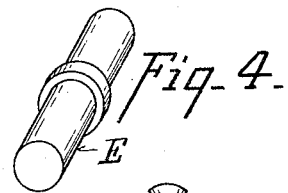
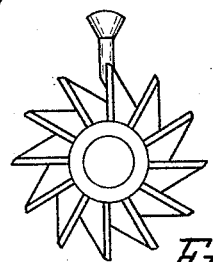

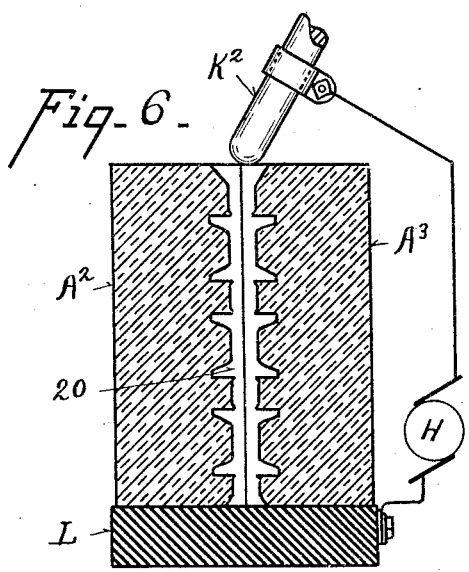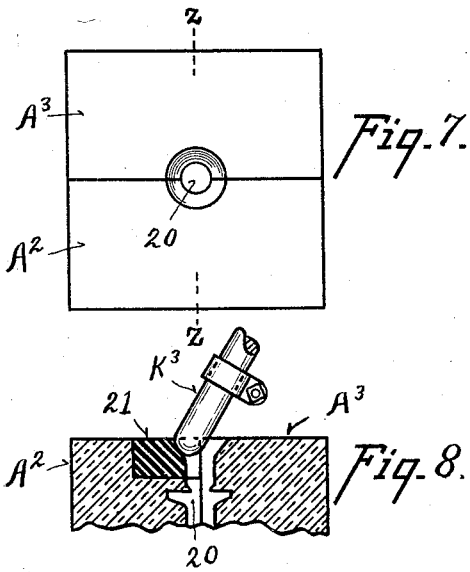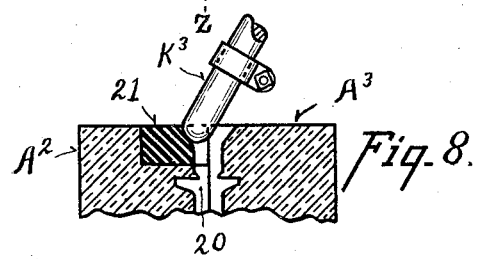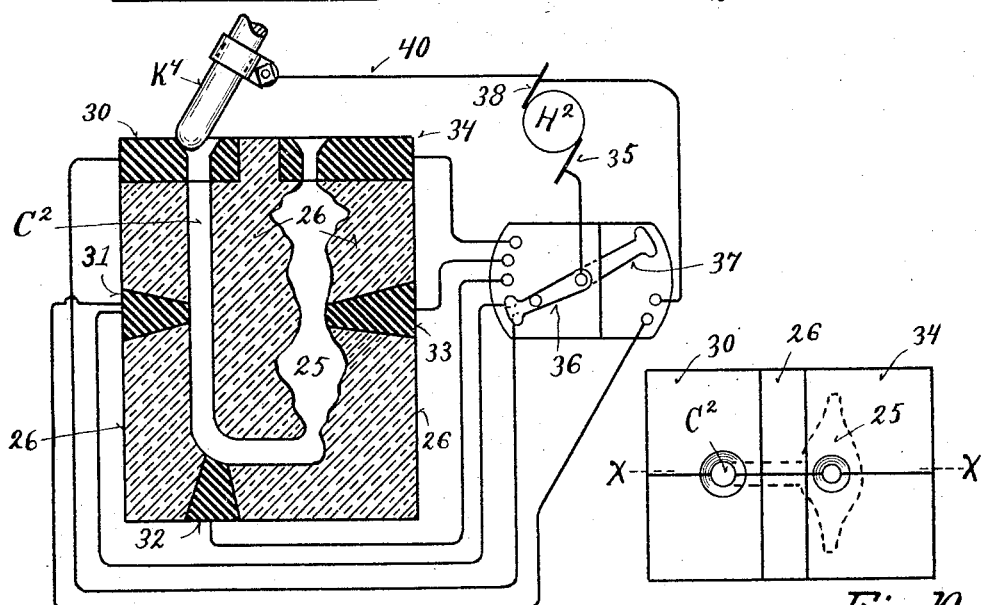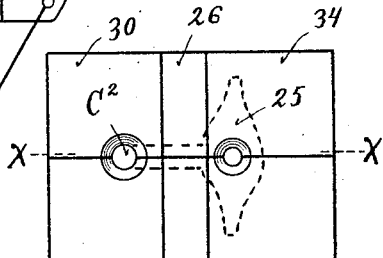

UNITED STATES PATENT OFFICE.

CASPER W. MILES, OF ANDERSON TOWNSHIP, HAMILTON COUNTY, OHIO.

METHOD AND APPARATUS FOR CASTING.

1,123,134.  Specification of Letters Patent.  Patented Dec. 29, 1914.

Application filed December 14, 1911. Serial No. 665,724.

*To all whom it may concern:*

Be it known that I, CASPER W. MILES, a citizen of the United States, residing at Anderson township, in the county of Hamilton and State of Ohio, have invented certain new and useful Improvements in Methods and Apparatus for Casting, of which the following is a specification.

My invention relates to improvements in the method and apparatus for casting.

One of its objects is to apply a melting heat to the requisite amount of metal or other substance by electrical means to deposit the metal in the mold.

Another object is to deposit the metal in the molds without liability of the metal taking up gases or other foreign matter during the melting operation.

Another object is to provide a method of fusing and depositing highly infusible metals in molds.

Another object is to provide means for producing a plurality of castings from a single mold.

Another object is to provide improved means to produce castings of greater accuracy and thereby to avoid subsequent machine operations.

Another object is to provide improved molds and means to control the current to the molds and to the metal to form the castings.

My invention further consists in certain details and order of procedure, as well as form, combination and arrangement of apparatus, all of which will be fully set forth in the description of the accompanying drawings, in which;

Figure 1 is a diagram of my improved apparatus showing one form of mold in central vertical section, said section being on line *v v* of Fig. 2. Fig. 2 a top plan view of the mold illustrated in Fig. 1. Fig. 3 is a sectional detail illustrating a modification of Fig. 1. Fig. 4 is a perspective view of a core to be employed in the mold Fig. 1. Fig. 5 is a side elevation of a casting adapted to be formed in the mold Fig. 1. Fig. 6 is a view similar to Fig. 1, illustrating a modification. Fig. 7 is a top plan view of the mold Fig. 6. Fig. 8 is a sectional detail illustrating a modification of the mold Fig. 6. Fig. 9 is a view similar to Fig. 1 illustrating another modification of my improved apparatus. Fig. 10 is a top plan view of the mold of Fig. 9.

The accompanying drawings illustrate the preferred embodiments of my invention.

As illustrated in Figs. 1 and 2 a mold of two or more parts is formed from suitable clay, earth, and carbon materials, preferably finely divided and reduced to a plastic condition, whereupon the mold sections are themselves molded and then dried or baked to render them dry and rigid. Thus the sections A A′ may be composed of carbon blocks, or blocks composed of carbon and clays or earth materials mixed in the desired proportion, and capable of acting as conductors of an electrical current.

A mold cavity B is formed in one or both of the adjacent faces of the members A A′, with a port or gate C leading from the exterior of the mold to said cavity for the introduction of the metal. Interposed between the adjacent faces of the members A A′ is a zone of electrically non-conducting material D, which may be merely a coating or skin on the face of one or both of the members A A′, or may be of material thickness, depending upon the nature of the mold or casting to be produced. The zone member D may be formed of clay, one of the earth oxids, or any composition of heat resisting and electrical non-conducting material, separately molded or applied to the adjacent faces of the members A A′.

E represents a core composed of electrical non-conducting material similar in composition to that of the zone member D and separately molded. The member E is supported in position in the mold cavity by means of core prints or recesses 2 formed in the members A A′. As illustrated the members A A′ are clamped together between two metal plates F F′ by means of bars 3 and cross bolts 4. The electrical contacts are made with the members F F′ which by reason of their extended surface serve to secure good electrical contact with the members A A′.

Current either alternating or direct preferably of low voltage and large volume is supplied by the generator H and is conducted by line 5 to the member F from one of the generator collectors 6. From the other generator collector 7 a line 11 leads through a resistance controlling member 8 to the member F′.

K represents a rod of the metal or material from which the casting is to be formed.

A branch line 9 leads from the collector 7 through a resistance controlling member 10 and is connected by a flexible connection to the rod K. The controlling members 8 and 10 are capable of being regulated by their levers to regulate the amount of current which it is desired to pass through the lines 9 and 11 respectively, and the amount of current may be regulated if desired during the casting operation. With the generator in operation no current passes through the line 11 until the metal commences to flow into the mold, and no current flows through line 9 until the rod K is brought into contact with the member A at the entrance to the gate C. Upon making contact between the rod K and member A at the entrance of the gate C as indicated in Fig. 1, the heat generated at the end of the rod K is sufficient to fuse a portion of the metal which flows through the gate into the mold cavity where it establishes a current between members A and A' across said cavity, which current develops sufficient heat in the metal in said cavity to keep the metal in said cavity in a fused condition until said cavity becomes entirely filled with metal flowing from the end of the rod K, whereupon the circuit through line 9 is interrupted by withdrawing the rod K from member A, and the current through line 11 is either gradually reduced in amount and finally interrupted by breaking contact at the controller 8 by shifting its lever, or the current may be instantly broken by shifting the lever of controller 8. In practice the controller 8 serves to regulate the amount of current flowing through the mold cavity while said cavity is being filled with metal in order not to excessively or under heat the metal in the mold. The controller 10 serves to regulate the current through the rod K so that the metal of said rod may be fused at the desired rate and not be overheated or supplied in quantity to overflow the gate. Suitable vents not shown are provided for the escape of air from the mold cavity.

In the modification, Fig. 3, no line connection from the generator is made with the rod K', and in order to flow metal into the mold cavity said rod is caused to simultaneously contact with members A and A' such as shown in Fig. 1 thus establishing a current through said rod from one of said members to the other and fusing the metal at the end of said rod. If desired more than one gate or port for the introduction of metal may be provided, also variously shaped cores of either conducting or non-conducting material may be employed in the several mold modifications, depending upon the shape and nature of the casting to be produced.

In the modification, Figs. 6 and 7, the mold comprises a plate or member L of carbon, metal, or other conducting material and two members $A^2$ $A^3$ of non-conducting material in which is a mold cavity 20 for a number of small duplicate castings gated together. This cavity is adapted to be filled with metal in a divided or finely divided state by feeding the same in at the top of the mold cavity, whereupon a current is established through the divided metal in the mold cavity by bringing the rod $K^2$ into contact with the divided metal at the top of the mold cavity, whereupon said divided metal is fused and either more divided metal added until the mold cavity is filled, or the additional metal may be supplied by fusion from the end of rod $K^2$. In the modification, Fig. 8, the mold is similar to that illustrated in Figs. 6 and 7 except that a conducting member 21 is located at the gate entrance, and upon contact being made between the rod $K^3$ and the member 21 the circuit is closed and the metal of rod $K^3$ is fused and flows into the mold cavity until the mold is filled and current established between the rod $K^3$ and the member L at the bottom of the mold, when member 21 may be cut out of circuit.

In the modification, Figs. 9 and 10, which is designed to produce castings of complicated shape, the metal is fed through a gate $C^2$ so as to enter at the bottom of the mold cavity 25. The main portion of the mold is composed of non-conducting material 26, in which are inserted a series of conducting members 30, 31, 32, 33, 34, all of which are adapted to be connected successively with the collector 35 of the generator $H^2$ by means of a switch lever 36 which is preferably arranged to make two contacts at a time. I also preferably provide a switch lever 37 to connect the collector 38 of the generator with the contact 31 at a late stage of the casting operation when the mold has become nearly or quite filled with metal. In operation the switch levers 36 and 37, which preferably move in unison are set as indicated in Fig. 9, and the rod $K^4$ is connected by line 40 with collector 38 of the generator. Current is established by making contact between rod $K^4$ and contact 30 and the fused metal flows down the gate and upon reaching contact 31 is kept in fused condition or further heated by current flowing from contact 31 to rod $K^4$, when the flow of metal reaches contact 32 the switch lever 36 is shifted to make contact through the fused metal from 31 and 32 with rod $K^4$, and when the fused metal rises in the mold cavity to contact 33, the switch 36 is again shifted to pass current from 32 and 33 to the rod $K^4$, and when the metal reaches contact 34 the switches are again shifted which connects the collector 35 with contacts 33 and 34 and connects collector 31 as well as rod $K^4$ with collector 38, thus insuring a flow of current through the fused metal after contact is broken at rod $K^4$, and until contact is broken at the switches 36, 37. Other combinations of contacts similar to those illustrated in Fig. 9 may be employed to meet the requirements of different molds.

By employing molds of the character herein set forth I am enabled to select mold material having little if any chemical action upon the metal to be cast, and to fill the molds with such rapidity as to provide very little time for chemical action between the metal and the mold to take place. I also avoid any tendency of the metal to absorb gases during its period of fusion. I am also enabled without injury to the metal to bring to the desired fluid condition the more difficultly fusible metals, and to obtain good castings therefrom. With many metals and alloys two or more castings can be obtained from the same molds. Casting metal having a corrosive action upon metal molds can be used to advantage and without corrosive action upon the molds. Due to the accuracy of the molds and cores, castings of complicated form requiring no subsequent machine operations can be produced.

The method and mechanism as herein set forth are capable of considerable modification without departing from the spirit and principle of my invention.

Having described my invention, what I claim is:

1. A method of metal casting which comprises fusing the solid metal by including it in a non-arcing electric circuit outside of a mold, flowing the fused metal into the mold, and continuing the flow of a non-arcing electric current through the metal after it is in the mold to maintain its fluidity, until the mold is filled.

2. A process of casting which comprises subjecting solid metal to a melting electric current to cause the metal to fuse and flow into a mold, continuing the flow of electric current through the metal after it is in the mold, and progressively decreasing and finally interrupting the current through the metal in the mold.

3. A method of casting which comprises introducing the metal to be cast into a mold of non-metallic material having a mold cavity forming a gap between electric circuit terminals, thereby completing a non-arcing electric circuit between said terminals to heat the metal, and continuing said current through said mold cavity until the mold cavity is filled.

4. A method of casting which comprises passing a melting electric current through the material to be cast within the mold cavity of a mold having a zone of electrically non-conducting material within which a portion of the mold cavity is formed, said current passing through the mold cavity across said zone of non-conducting material.

5. A casting mold comprising a plurality of sections respectively of electrically conducting and electrically non-conducting material to be assembled together to provide a mold cavity, said electrically conducting sections forming circuit terminals to direct an electric current across said mold cavity through the material to be cast.

6. A casting mold comprising a plurality of sections respectively of electrically conducting and electrically non-conducting material molded from material in plastic condition and subsequently rendered rigid, said sections being assembled together to provide a mold cavity and said electrically conducting sections also forming electric circuit terminals to direct an electric circuit across the mold cavity through the material to be cast.

7. A method of metal casting which comprises including solid metal in a non-arcing electric circuit substantially at the entrance of a mold so that the metal as it fuses will flow by gravity into and fill the mold cavity.

8. A casting mechanism comprising a stationary mold having a mold cavity, means located substantially at the entrance to said mold to include the metal to be cast as a resistance in a non-arcing electric circuit to fuse the metal, and means to pass a non-arcing electric current through said mold cavity.

9. A casting mechanism comprising a mold having a mold cavity, and means to melt the material to be cast by including it as a resistance in a non-arcing electric circuit of comparatively low voltage and large volume substantially at the entrance to the mold so that the material to be cast as it fuses will flow by gravity into and fill the mold cavity.

10. A casting mechanism comprising a mold of non-metallic material composed of a plurality of sections assembled together to form a mold cavity, and means to melt the metal to be cast outside of the entrance to said mold cavity at a point where the metal will flow as it fuses by gravity into said mold cavity by including the metal to be cast in a non-arcing electric circuit.

11. A casting mechanism comprising a mold composed of a plurality of mold sections respectively of electrically conducting material and electrically non-conducting material, said sections being assembled to form a mold cavity, and means to melt the metal outside of said mold at a point where the fused metal will flow into said mold cavity by including the metal to be cast in an electric circuit.

12. A casting mechanism comprising a mold composed of a carbon section and a section of electrically non-conducting material, said sections when assembled providing a mold cavity, and means to melt the metal to be cast by including it in an electric circuit.

13. A casting mechanism comprising a mold composed of a section of electrically conducting material and a section of electrically non-conducting material, said sections when assembled providing a mold cavity, and means to melt the metal to be cast by including it in an electric circuit of which said electrically conducting mold section is one of the terminals.

14. A mold for casting comprising a mold section of electrically conducting material and a mold section of electrically non-conducting material assembled to provide a mold cavity, and a core section seated in a recess in said mold and projecting into said mold cavity.

15. A mold for casting comprising a molded carbon section and a section of electrically non-conducting material, said sections when assembled providing a mold cavity.

16. A casting mechanism comprising a mold composed of a plurality of carbon sections and a section of electrically non-conducting material, said sections when assembled providing a mold cavity, and means to melt the metal to be cast by including it in an electric circuit of which said carbon sections constitute the terminals.

17. A casting mechanism comprising a mold composed of a section of electrically conducting material and a section of electrically non-conducting material forming when assembled a mold cavity, a core section seated in a recess in said mold sections and projecting into said mold cavity, and means to pass a melting electric current through the metal to be cast across said mold cavity.

18. A casting mechanism comprising a mold section of electrically conducting material and a mold section of electrically non-conducting material assembled to form a mold cavity, means to pass an electric current through the metal to be cast across said mold cavity, and a core section of electrically non-conducting material spanning said mold cavity.

19. A mold for casting comprising a plurality of mold sections of electrically conducting material and a section of electrically non-conducting material assembled to provide a mold cavity, and a core section of electrically non-conducting material seated in recesses in said mold sections and spanning said mold cavity.

20. A method of casting metal articles which comprises including solid metal in an electric circuit substantially at the entrance to a mold to fuse the metal, and causing the metal as it fuses to flow by gravity into and fill the mold cavity.

In testimony whereof I have affixed my signature in presence of two witnesses.

CASPER W. MILES.

Witnesses:
B. R. Kropf,
V. J. Gott.

Copies of this patent may be obtained for five cents each, by addressing the "Commissioner of Patents, Washington, D. C."